United States Patent
Naito

(10) Patent No.: US 11,522,712 B2
(45) Date of Patent: Dec. 6, 2022

(54) MESSAGE AUTHENTICATION APPARATUS, MESSAGE AUTHENTICATION METHOD, AND COMPUTER READABLE MEDIUM

(71) Applicant: Mitsubishi Electric Corporation, Tokyo (JP)

(72) Inventor: Yusuke Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 2 days.

(21) Appl. No.: 17/175,391

(22) Filed: Feb. 12, 2021

(65) Prior Publication Data

US 2021/0167968 A1 Jun. 3, 2021

Related U.S. Application Data

(63) Continuation of application No. PCT/JP2018/032082, filed on Aug. 30, 2018.

(51) Int. Cl.
*H04L 9/32* (2006.01)
*H04L 9/06* (2006.01)

(52) U.S. Cl.
CPC .......... *H04L 9/3242* (2013.01); *H04L 9/0618* (2013.01)

(58) Field of Classification Search
CPC ............................ H04L 9/3242; H04L 9/0618
See application file for complete search history.

(56) References Cited

U.S. PATENT DOCUMENTS 10,326,589 B2 * 6/2019 Naito .................... H04L 9/0618
2006/0285684 A1 * 12/2006 Rogaway .............. H04L 9/0637
380/37

(Continued)

FOREIGN PATENT DOCUMENTS

WO WO 2007/052477 A1 5/2007
WO WO 2010/024004 A1 3/2010

(Continued)

OTHER PUBLICATIONS

Beierle et al., "The Skinny Family of Block Ciphers and its Low-Latency Variant MANTIS", CRYPTO 2016, pp. 1-53.

(Continued)

*Primary Examiner* — Ponnoreay Pich
(74) *Attorney, Agent, or Firm* — Birch, Stewart, Kolasch & Birch, LLP

(57) ABSTRACT

A message authentication apparatus compresses a message M into a value H of 2n bits, and divides the value H into two values H[1] and H[2] each having n bits. The message authentication apparatus extracts two values U[1] and U[2] each having min{t, n/2} bits from the value H[1], generates a value V[1] of t bits, using as input the message M and the value U[1], and generates a value V[2] of t bits, using as input the message M and the value U[2]. The message authentication apparatus encrypts the value H[2] by a tweakable block cipher E, using the value V[1] as a tweak, to generate a value Z[1], and encrypts the value H[2] by the tweakable block cipher E, using the value V[2] as a tweak, to generate a value Z[2]. The message authentication apparatus generates an authenticator Z from the value Z[1] and the value Z[2].

8 Claims, 8 Drawing Sheets

(56) References Cited

U.S. PATENT DOCUMENTS

| | | | |
|---|---|---|---|
| 2009/0138710 A1 | 5/2009 | Minematsu | |
| 2019/0294821 A1* | 9/2019 | Roake | H04L 9/0631 |
| 2021/0167968 A1* | 6/2021 | Naito | H04L 9/0618 |

FOREIGN PATENT DOCUMENTS

| | | | | |
|---|---|---|---|---|
| WO | WO-2010024004 A1 * | 3/2010 | | H04L 9/0618 |
| WO | WO-2015102783 A2 * | 7/2015 | | G06F 12/1408 |
| WO | WO 2016/067524 A1 | 5/2016 | | |

OTHER PUBLICATIONS

International Search Report for PCT/JP2018/032082 (PCT/ISA/210) dated Nov. 20, 2018.

Iwata et al., "ZMAC: A Fast Tweakable Block Cipher Mode for Highly Secure Message Authentication", CRYPTO 2017, pp. 1-36.

Jean et al., "Tweaks and Keys for Block Ciphers: The TWEAKEY Framework", ASIACRYPT 2014, Part II, LNCS 8874, pp. 274-288, 2014.

List et al., "Revisiting Full-PRF-Secure PMAC and Using it for Beyond-Birthday Authenticated Encryption", CT-RSA 2017, pp. 1-22.

List et al., "ZMAC$^{30}$ —Efficient Variable-output-length Variant of ZMAC", ToSC 2017, No. 4, pp. 306-325.

Naito, "Full PRF-Secure Message Authentication Code Based on Tweakable Block Cipher", ProvSec 2015, LNCS 9451, pp. 167-182, 2015.

\* cited by examiner

MESSAGE AUTHENTICATION APPARATUS, MESSAGE AUTHENTICATION METHOD, AND COMPUTER READABLE MEDIUM

CROSS REFERENCE TO RELATED APPLICATION

This application is a Continuation of PCT International Application No. PCT/JP2018/032082, filed on Aug. 30, 2018, which is hereby expressly incorporated by reference into the present application.

TECHNICAL FIELD

The present invention relates to a message authentication technique using a tweakable block cipher.

BACKGROUND ART

Tampering of data can be detected by using a message authentication algorithm. Data handled in the message authentication algorithm is called a message.

The message authentication algorithm is a function that takes as input a message M of an arbitrary length and a secret key K, and outputs an authenticator Z of a fixed length for detecting tampering.

Assume that a sender is Alice and a receiver is Bob. When performing communication using the message authentication algorithm, Alice and Bob share a secret key K in advance.

Alice generates an authenticator Z for a message M from the message M and the key K using the message authentication algorithm, and sends the message M and the authenticator Z to Bob. Bob receives the message M and the authenticator Z, and generates an authenticator Z' from the message M and the key K using the message authentication algorithm. Bob determines that the message M has not been tampered with if a match exists between the received authenticator Z and the generated authenticator Z', and determines that the message M has been tampered with if no match exists.

Pseudo-randomness is used for security of the message authentication algorithm. Pseudo-randomness is security such that, using a distinguisher D that outputs a 1-bit value of 0 or 1, consideration is given to a difference between the probability that the distinguisher D will output 1 after accessing the message authentication algorithm and observing output values and the probability that the distinguisher D will output 1 after accessing a random function R and observing output values. This difference is called advantage of pseudo-randomness.

For a message authentication algorithm $F_K$ using a secret key K, advantage $Ad_{VF}(D)$ of the distinguisher D is as indicated below.

$$Ad_{VF}(D)=Pr[D(F_K)=1]-Pr[D(R)=1]$$

The key K is selected randomly. With the random function R, an input is of any length and an output is of the same output length as that of $F_K$. An output of the random function R is selected randomly for a new input. If the same input has previously been given, the output of the random function R is the same value as the previous value. $D(F_K)$ is an output value when the distinguisher D accesses the message authentication algorithm. $D(R)$ is an output value when the distinguisher D accesses the random function R.

As a method for constructing the message authentication algorithm $F_K$, there is a method using a tweakable block cipher.

Let Set(K) and Set(T) be certain finite sets. A tweakable block cipher E is a function that takes as input a key K, which is an element of Set(K), a tweak value T, which is an element of Set(T), and a plaintext P of n bits, and outputs a ciphertext C of n bits. This is denoted as $C=E_K(T, P)$. The size n of the tweakable block cipher and the plaintext is called a block size. The tweakable block cipher E is a permutation of n bits when the key K and the tweak value T are fixed, and is another permutation when the key K or the tweak value T is changed.

The tweakable block cipher E is described in Non-Patent Literature 1 and Non-Patent Literature 2.

When a message authentication algorithm is designed using a tweakable block cipher, pseudo-randomness is used as security of the message authentication algorithm. In order to evaluate pseudo-randomness, evaluation is performed by replacing a tweakable block cipher $E_K$ using a key K with a tweakable random permutation π. At this time, the number of queries q of accesses made to the message authentication algorithm by the distinguisher D and the number of invocations σ of the tweakable random permutation in calculations in the message authentication algorithm are used.

The tweakable random permutation π takes as input a tweak value T, which is an element of Set(T), and a plaintext P of n bits, and outputs a ciphertext C of n bits. The tweakable random permutation π is a random permutation of n bits when the tweak value T is fixed, and is another random permutation when the tweak value T is changed.

For integers a and b such that a≤b, [a, b] denotes a set of integers from a to b, that is, [a, b]={a, a+1, ..., b−1, b}. For a bit string X, |X| denotes the bit length of the bit string X. For a positive integer a that satisfies a≤|X|, X[1, a] denotes the most significant a bits of X. For positive integers a and b, $str_b(a)$ denotes a value expressing the integer a in b bits. For example, $str_3(2)=010$.

For a positive integer t, a value X of n bits, and a value Y of t bit, the operator indicated in Formula 1 is defined as indicated in Formula 2.

$$\oplus_t \quad \text{[Formula 1]}$$

if $t<n$ $X \oplus_t Y = X[1,t] \oplus Y$, if $n \le t$ $X \oplus_t Y = (X \| 0^{t-n}) \oplus Y$ [Formula 2]

The operator indicated in Formula 3 denotes a multiplication on a Galois field $GF(2^n)$, and x denotes a generator of the Galois field $GF(2^n)$.

$$\ominus \quad \text{[Formula 3]}$$

There is a tweakable block cipher that uses two arguments (j, T) as a tweak. For a positive integer r, a positive integer i that satisfies $i \le 2^r - 1$, and an integer t, a set Set(T) of tweakable block ciphers is defined as $Set(T)=[0, i] \times \{0, 1\}^t$. That is, the first argument j of the tweak is a value included in [0, i] and the second argument T of the tweak is a value expressed by $\{0, 1\}^t$.

A tweakable block cipher using the first argument $j \in [0, i]$ and a key K is denoted as $E_K^j$. That is, when the tweak is (j, T) and a plaintext is P, a ciphertext is $C=E_K^j(T, P)$.

In the tweakable block ciphers described in Non-Patent Literature 1 and Non-Patent Literature 2, Set (T)={0, 1}$^s$ is defined for a given integers. To adapt Set(T)=[0, i]×{0, 1}$_t$ for the tweakable block cipher with Set(T)={0, 1}$^s$, r bits of s bits are used for [0, i] and the remaining s−r bits are used for {0, 1}$^t$.

Message authentication algorithms using tweakable block ciphers are described in Non-Patent Literature 3 to Non-Patent Literature 5.

Non-Patent Literature 3 describes a message authentication algorithm in which, for a positive integer t, a set of tweaks is defined as $Set(T)=[0, 2] \times \{0, 1\}^t$. Non-Patent Literature 6 indicates that when n≤t, the advantage of pseudo-randomness of the message authentication algorithm described in Non-Patent Literature 3 is bound by the probability indicated in Formula 4. In Formula 4, F is the message authentication algorithm described in Non-Patent Literature 3.

$$Adv_F(D) \leq O\left(\frac{q}{2^n}\right) \quad \text{[Formula 4]}$$

This upper bound value of the advantage is called a bound. The bound does not become 1 until the number of queries by the distinguisher D reaches $q=O(2^n)$. Therefore, when n t, pseudo-randomness can be guaranteed until the number of queries reaches $q=O(2^n)$.

Non-Patent Literature 4 proposes a message authentication algorithm in which, for a positive integer t, $Set(T)=[0, 5] \times \{0, 1\}^t$ is defined. Non-Patent Literature 4 indicates the bound of the advantage of pseudo-randomness indicated in Formula 5 for the message authentication algorithm described in Non-Patent Literature 4. In Formula 5, F is the message authentication algorithm described in Non-Patent Literature 4.

$$Adv_F(D) \leq O\left(\frac{\sigma^2}{2^{n+\min\{n,t\}}} + \left(\frac{q}{2^n}\right)^{3/2}\right) \quad \text{[Formula 5]}$$

Therefore, when n≤t, pseudo-randomness can be guaranteed until the number of invocations of the tweakable random permutation reaches $\sigma=O(2^n)$.

Non-Patent Literature 5 describes a message authentication algorithm in which the amount of computation of the message authentication algorithm described in Non-Patent Literature 4 is reduced. Non-Patent Literature 5 indicates the bound of the advantage of pseudo-randomness indicated in Formula 6 for the message authentication algorithm described in Non-Patent Literature 5. In Formula 6, F is the message authentication algorithm described in Non-Patent Literature 5.

$$Adv_F(D) \leq O\left(\frac{q\sigma}{2^{n+\min\{n,t\}}} + \frac{q}{2^n}\right) \quad \text{[Formula 6]}$$

Therefore, when n≤t, pseudo-randomness can be guaranteed until the number of invocations of the tweakable random permutation reaches $\sigma=O(2^{n+\min\{n,t\}}/q)$, that is, $O(2^{2n}/q)$, or until the number of queries reaches $q=O(2^n)$.

Since q≤σ, the algorithm described in Non-Patent Literature 3 is the most secure algorithm among the message authentication algorithms using tweakable block ciphers.

CITATION LIST

Non-Patent Literature

Non-Patent Literature 1: Jeremy Jean, Ivica Nikolic, Thomas Peyrin. Tweaks and Keys for Block Ciphers: The TWEAKEY Framework. ASIACRYPT 2014. pp. 274-288. LNCS volume 8874. Springer.

Non-Patent Literature 2: Christof Beierle, Jeremy Jean, Stefan Kolbl, Gregor Leander, Amir Moradi, Thomas Peyrin, Yu Sasaki, Pascal Sasdrich, Siang Meng Sim. The SKINNY Family of Block Ciphers and Its Low-Latency Variant MANTIS. CRYPTO 2016. pp. 123-153. LNCS volume 9815. Springer.

Non-Patent Literature 3: Yusuke Naito. Full PRF-Secure Message Authentication Code Based on Tweakable Block Cipher. ProvSec 2015. pp. 167-182. LNCS volume 9451. Springer.

Non-Patent Literature 4: Tetsu Iwata, Kazuhiko Minematsu, Thomas Peyrin, Yannick Seurin. ZMAC: A Fast Tweakable Block Cipher Mode for Highly Secure Message Authentication. CRYPTO 2017. pp. 34-65. LNCS volume 10403. Springer.

Non-Patent Literature 5: Eik List, Mridul Nandi. ZMAC+— An Efficient Variable-output-length Variant of ZMAC. IACR Trans. Symmetric Cryptol. 2017 volume 4. pp. 306-325.

Non-Patent Literature 6: Eik List, Mridul Nandi. Revisiting Full-PRF-Secure PMAC and Using It for Beyond-Birthday Authenticated Encryption. CT-RSA 2017. pp. 258-274. LNCS volume 10159. Springer.

SUMMARY OF INVENTION

Technical Problem

In the existing message authentication algorithms using tweakable block ciphers, a tweakable block cipher that satisfies n t is required in order to guarantee pseudo-randomness until the number of queries by the distinguisher D reaches $q=O(2^n)$.

An example of a tweakable block cipher that satisfies the condition of t<n is the method described in Non-Patent Literature 1. However, there exists no message authentication algorithm that satisfies t<n and guarantees pseudo-randomness until the number of queries by the distinguisher D reaches $q=O(2^n)$.

It is an object of the present invention to allow a message authentication algorithm with high security using a tweakable block cipher to be realized.

Solution to Problem

A message authentication apparatus according to the present invention generates an authenticator Z for a message M, using a tweakable block cipher E that takes as input a tweak of t bits and outputs a value of n bits, where t and n are integers of 1 or more, and the message authentication apparatus includes:

a compression unit to compress the message M into a value H of 2n bits, and divide the value H into two values, a value H[1] and a value H[2], each having n bits;

a tweak calculation unit to extract two values, a value U[1] and a value U[2], each having min{t, n/2} bits from the value H[1], generate a value V[1] of t bits using as input the message M and the value U[1], and generate a value V[2] of t bits using as input the message M and the value U[2];

a first encryption unit to encrypt the value H[2] by the tweakable block cipher E, using the value V[1] as a tweak, to generate a value Z[1], and encrypt the value H[2] by the tweakable block cipher E, using the value V[2] as a tweak, to generate a value Z[2]; and an authenticator generation unit to generate the authenticator Z from the value Z[1] and the value Z[2].

Advantageous Effects of Invention

The present invention can realize a message authentication algorithm with high security using a tweakable block cipher.

DESCRIPTION OF EMBODIMENTS

First Embodiment

Description of Configuration*

Figure 1:
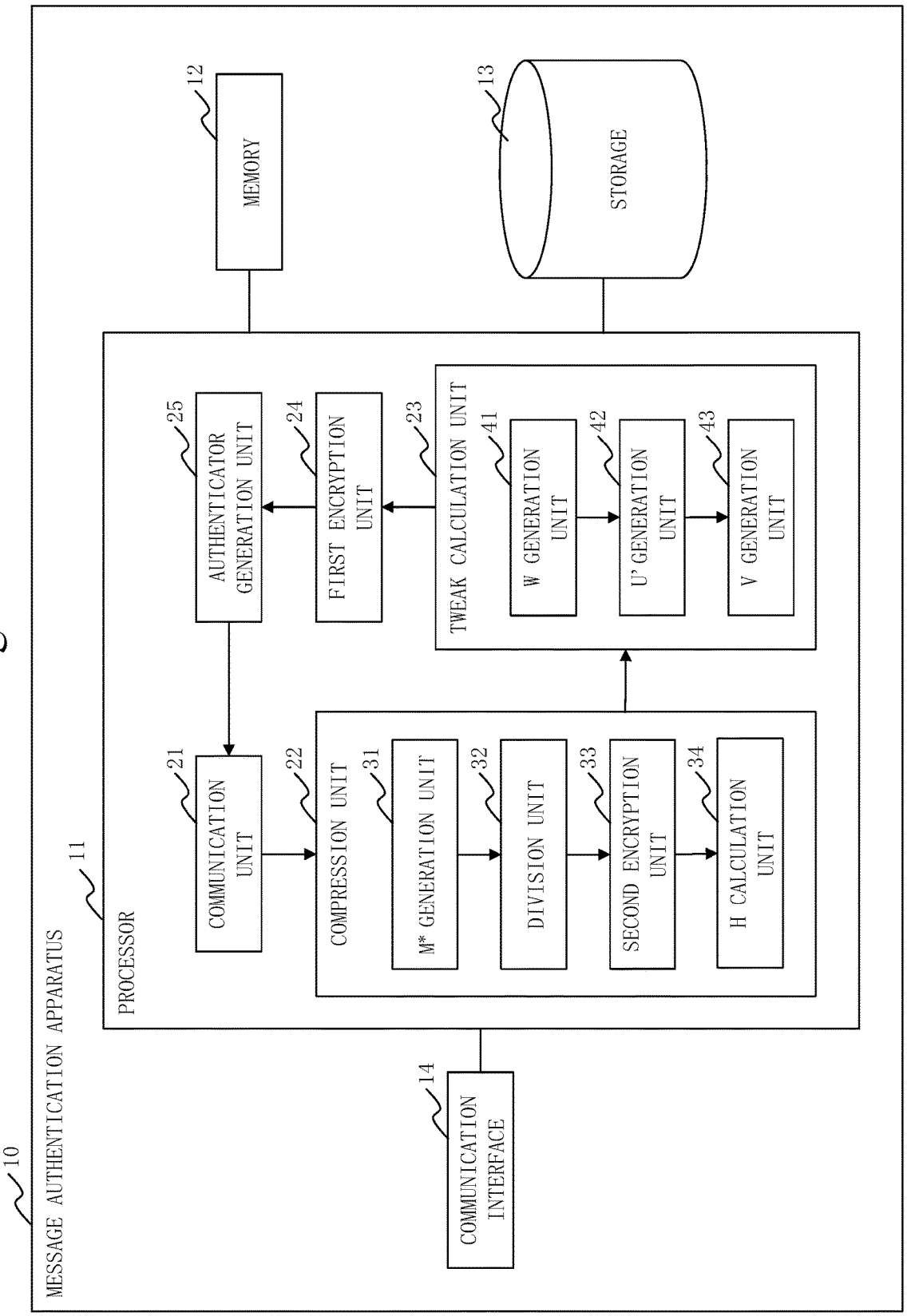
FIG. 1 is a configuration diagram of a message authentication apparatus 10 according to a first embodiment.

Referring to FIG. 1, a configuration of a message authentication apparatus 10 according to a first embodiment will be described.

The message authentication apparatus 10 includes hardware of a processor 11, a memory 12, a storage 13, and a communication interface 14. The processor 11 is connected with other hardware components via signal lines and controls the other hardware components.

The processor 11 is an integrated circuit (IC) that performs processing. Specific examples of the processor 11 are a central processing unit (CPU), a digital signal processor (DSP), and a graphics processing unit (GPU).

The memory 12 is a storage device to temporarily store data. Specific examples of the memory 12 are a static random access memory (SRAM) and a dynamic random access memory (DRAM).

The storage 13 is a storage device to store data. A specific example of the storage 13 is a hard disk drive (HDD). Alternatively, the storage 13 may be a portable recording medium such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disk (DVD).

The communication interface 14 is an interface for communicating with external devices. Specific examples of the communication interface 14 are an Ethernet (registered trademark) port, a Universal Serial Bus (USB) port, and a High-Definition Multimedia Interface (HDMI, registered trademark) port.

The message authentication apparatus 10 includes, as functional components, a communication unit 21, a compression unit 22, a tweak calculation unit 23, a first encryption unit 24, and an authenticator generation unit 25. The compression unit 22 includes an M* generation unit 31, a division unit 32, a second encryption unit 33, and an H calculation unit 34. The tweak calculation unit 23 includes a W generation unit 41, a U' generation unit 42, and a V generation unit 43. The functions of the functional components of the message authentication apparatus 10 are realized by software.

The storage 13 stores programs for realizing the functions of the functional components of the message authentication apparatus 10. These programs are loaded into the memory 12 by the processor 11 and executed by the processor 11. This realizes the functions of the functional components of the message authentication apparatus 10.

In FIG. 1, only one processor 11 is illustrated. However, a plurality of processors 11 may be included, and the plurality of processors 11 may cooperate to execute the programs for realizing the functions.

Description of Operation*

Referring to FIGS. 2 to 6, operation of the message authentication apparatus 10 according to the first embodiment will be described.

The operation of the message authentication apparatus 10 according to the first embodiment corresponds to a message authentication method according to the first embodiment. The operation of the message authentication apparatus 10 according to the first embodiment also corresponds to processes of a message authentication program according to the first embodiment.

Figure 2:
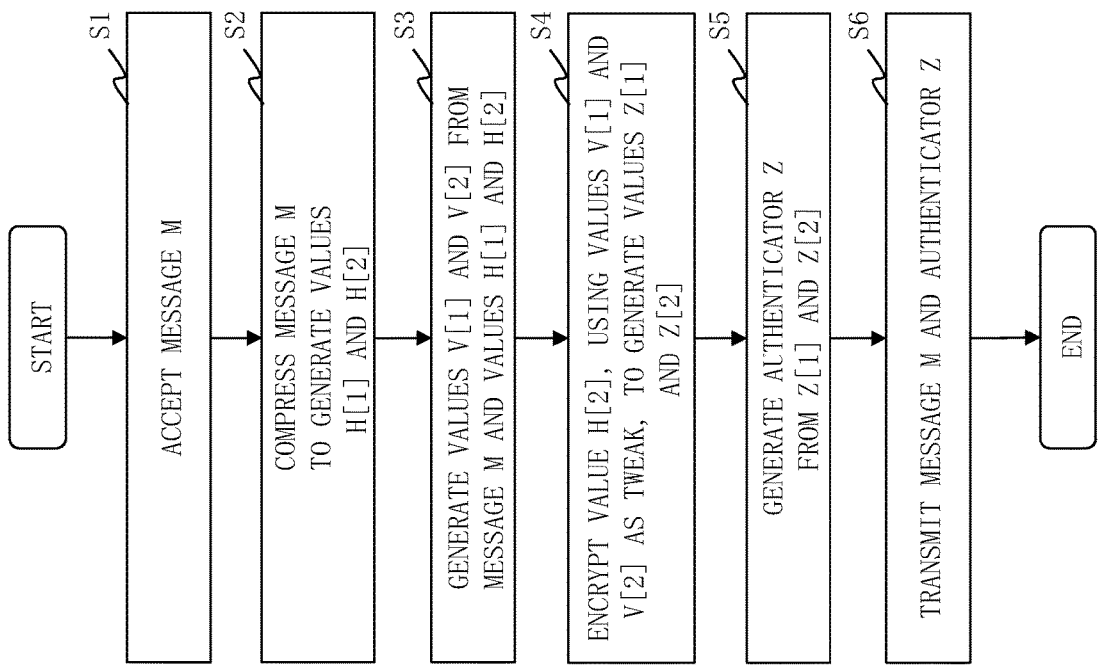
FIG. 2 is a flowchart of overall operation of the message authentication apparatus 10 according to the first embodiment.
Figure 3:
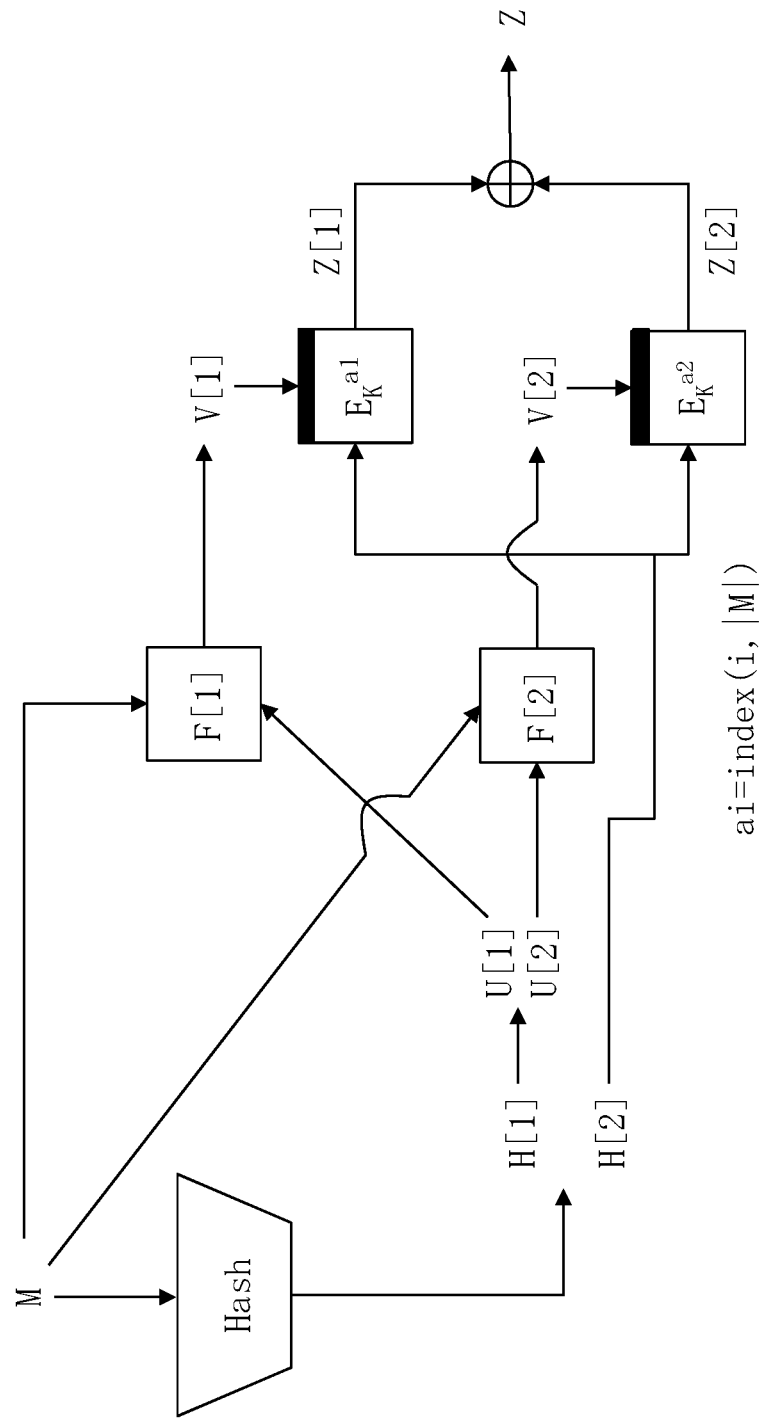
FIG. 3 is a diagram describing a message authentication algorithm realized by the message authentication apparatus 10 according to the first embodiment.

Referring to FIGS. 2 and 3, overall operation of the message authentication apparatus 10 according to the first embodiment will be described.

The message authentication apparatus 10 generates an authenticator Z for a message M, using a tweakable block cipher E that takes as input a tweak of t bits and outputs a value of n bits, where t and n are integers of 1 or more. The message authentication apparatus 10 uses a tweakable block cipher $E_K^j$ that uses two arguments (j, T) as a tweak. For an integer s such that 2≤s, a set of tweaks is defined as Set(T)=[0, s]×{0, 1}$^t$.

The following operation assumes that the message authentication apparatus 10 stores a key K shared with a transmission destination of a message M in the storage 13.

(Step S1: Input Process)

The communication unit 21 accepts, via the communication interface 14, the message M input by a user of the message authentication apparatus 10 through an operation on an input device or the like. The communication unit 21 writes the message M in the memory 12.

(Step S2: Compression Process)

The compression unit 22 retrieves the message M from the memory 12. The compression unit 22 compresses the message M into a value H of 2n bits, using a function Hash. The compression unit 22 divides the value H into two values, a value H[1] and a value H[2], each having n bits. The compression unit 22 writes the value H[1] and the value H[2] in the memory 12.

(Step S3: Tweak Calculation Process)

The tweak calculation unit 23 retrieves the value H[1] from the memory 12.

The tweak calculation unit 23 extracts two values, a value U[1] and a value U[2], each having min{t, n/2} bits from the value H[1]. As a specific example, the tweak calculation unit 23 extracts min{t, n/2} bits from the beginning of the value H[1] as the value U[1] and extracts min{t, n/2} bits from the end of the value H[1] as the value U[2]. Note that the value U[1] and the value U[2] may be extracted using a value p (H[1]) calculated with a substitution function p of n bits, instead of the value H[1].

The tweak calculation unit 23 calculates a function F[1], taking as input the message M and the value U[1], to generate a value V[1] of t bits. The tweak calculation unit 23 calculates a function F[2], taking as input the message M and the value U[2], to generate a value V[2] of t bits.

The tweak calculation unit 23 writes the value V[1] and the value V[2] in the memory 12.

(Step S4: First Encryption Process)

The first encryption unit 24 retrieves the value V[1], the value V[2], and the value H[2] from the memory 12.

The first encryption unit 24 encrypts the value H[2] by the tweakable block cipher E, using the value V[1] as the tweak, to generate a value Z[1]. The first encryption unit 24 encrypts the value H[2] by the tweakable block cipher E, using the value V[2] as the tweak, to generate a value Z[2]. The first encryption unit 24 writes the value Z[1] and the value Z[2] in the memory 12.

Specifically, the first encryption unit 24 uses index (i, |M|) as the first argument of the tweak and uses a value V[i] as the second argument of the tweak, for each integer i of i=1, 2. Note that |M| is the bit length of the message M, and index is a function that takes as input a value of [1, s] and the bit length |M| of the message and outputs a value of [1, s]. The first encryption unit 24 encrypts the value H[2] by the tweakable block cipher E to generate a value Z[i]. At this time, the first encryption unit 24 uses the key K stored in the storage 13. That is, the first encryption unit 24 calculates $Z[i]=E_K^{index(i,|M|)}(V[i], H[2])$.

(Step S5: Authenticator Generation Process)

The authenticator generation unit 25 retrieves the value Z[1] and the value Z[2] from the memory 12. The authenticator generation unit 25 generates an authenticator Z for the message M from the value Z[1] and the value Z[2]. As a specific example, the authenticator generation unit 25 generates an exclusive OR of the value Z[1] and the value Z[2] as the authenticator Z. The authenticator generation unit 25 writes the authenticator Z in the memory 12.

(Step S6: Transmission Process)

The communication unit 21 retrieves the message M and the authenticator Z from the memory 12. The communication unit 21 transmits the message M and the authenticator Z to the transmission destination via the communication interface 14.

Figure 4:
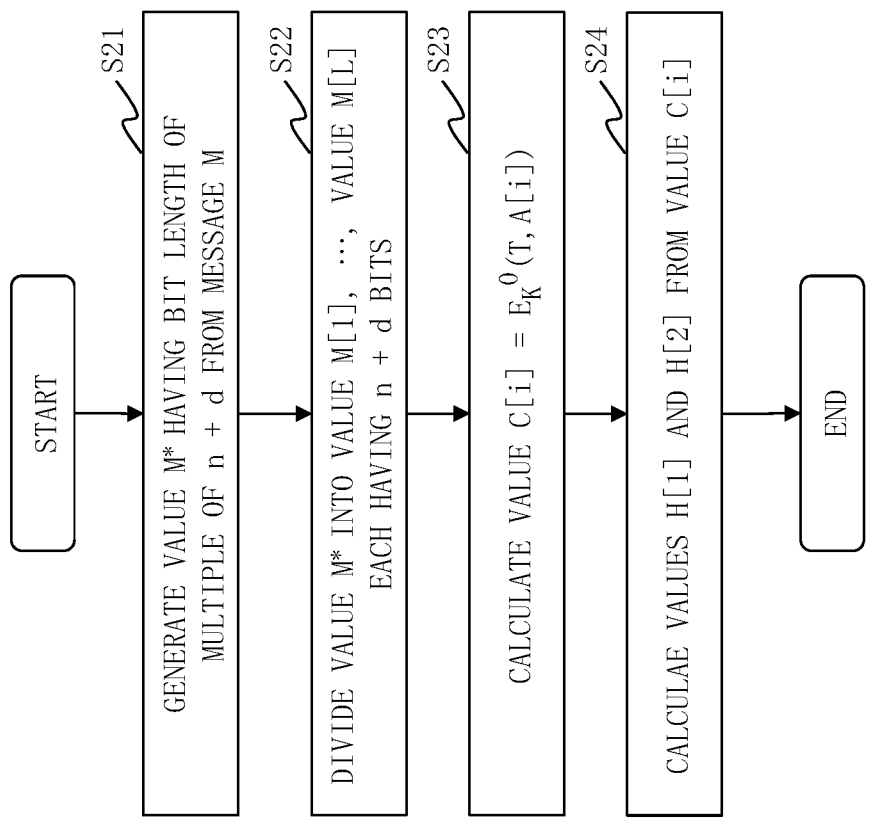
FIG. 4 is a flowchart of a compression process according to the first embodiment.
Figure 5:
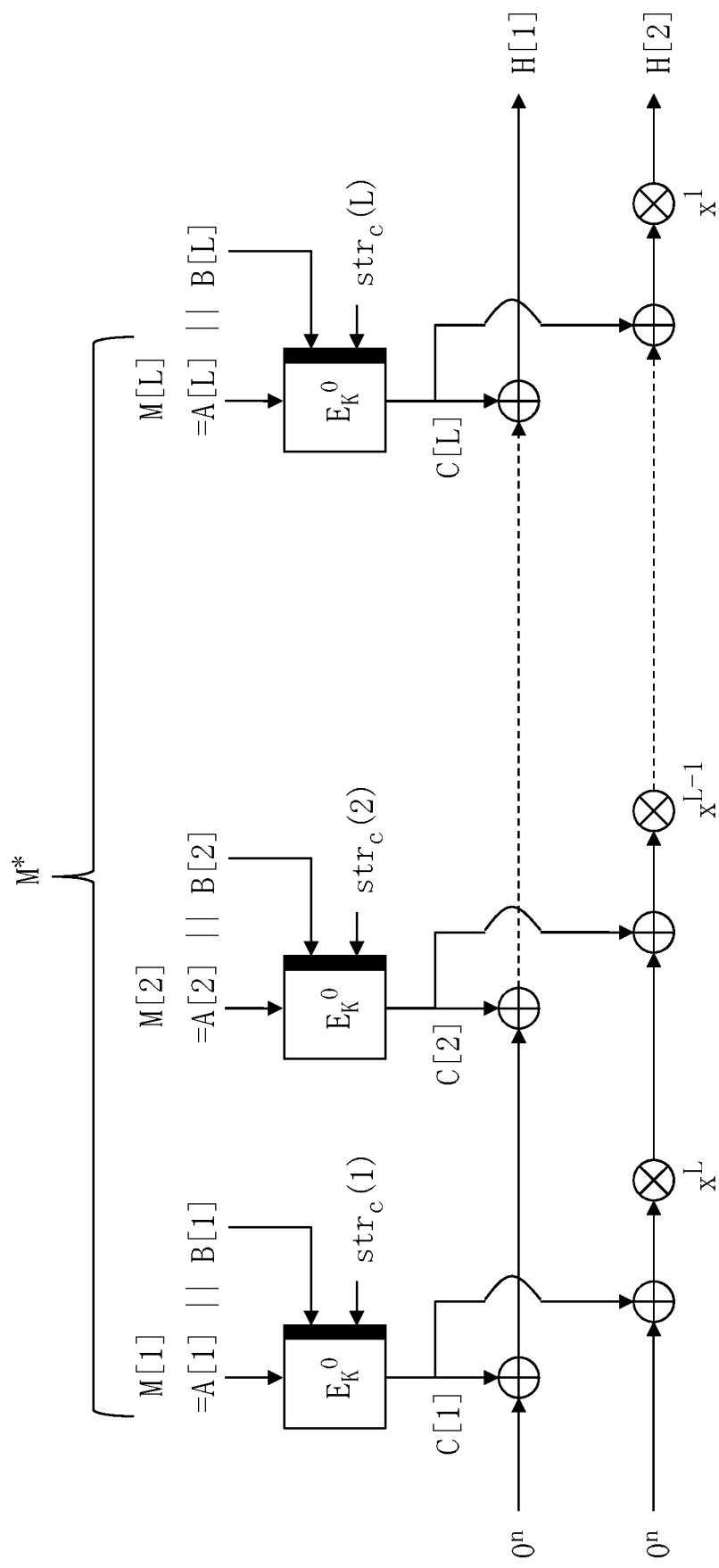
FIG. 5 is a diagram describing the compression process according to the first embodiment.

Referring to FIGS. 4 and 5, the compression process according to the first embodiment (step S2 of FIG. 2) will be described.

In the following description, it is assumed that a value c is an integer that satisfies 0≤c≤t and a value d is t−c.

(Step S21: M* Generation Process)

If the bit length |M| of the message M is not a multiple of n+d, the M* generation unit 31 adds a bit string to the message M to generate a value M* having a bit length of a multiple of n+d. As a specific example, the M* generation unit 31 adds a bit of 1 to the end of the message M and further adds one or more bits of 0 to generate the value M* having a multiple of n+d bits. That is, M*=M||1||0 . . . 0.

If the bit length |M| of the message M is a multiple of n+d, the M* generation unit 31 sets the message M as the value M*. That is, M*=M.

The M* generation unit 31 writes the value M* in the memory 12.

(Step S22: Division Process)

The division unit 32 retrieves the value M* from the memory 12. The division unit 32 divides the value M* from the beginning into L values, a value M[1], . . . , a value M[L], each having n+d bits. The division unit 32 writes the value M[1], . . . , the value M[L] in the memory 12.

(Step S23: Second Encryption Process)

The second encryption unit 33 retrieves the value M[i] from the memory 12, for each integer i of i=1, . . . , L. The second encryption unit 33 divides the value M[i] into a value A[i] of n bits and a value B[i] of d bits. The second encryption unit 33 encrypts the value A[i] by the tweakable block cipher E, using as the tweak a value T of t bits generated from the value B[i] and a value $str_c(i)$, which is the value i represented in c bits, to generate a value C[i]. The second encryption unit 33 writes the value A[i], the value B[i], and the value C[i] in the memory 12.

Specifically, the second encryption unit 33 uses 0 as the first argument of the tweak and the value T of t bits as the second argument of the tweak. For example, the value T is $str_c(i)||B[i]$. Note that the value T may by $\pi(B[i]||str_c(i))$ or the like, using a substitution function π of t bits. The second encryption unit 33 encrypts the value A[i] by the tweakable block cipher E to generate the value C[i]. At this time, the second encryption unit 33 uses the key K stored in the storage 13. That is, the second encryption unit 33 calculates $C[i]=E_K^0(T, A[i])$.

(Step S24: H Calculation Process)

The H calculation unit 34 retrieves the value C[i] for each integer i of i=1, . . . , L from the memory 12. The H calculation unit 34 calculates a value H, using the value C[i] for each integer i of i=1, . . . , L. Then, the H calculation unit 34 calculates the value H[1] and the value H[2] based on the value H. Note that the H calculation unit 34 may calculate the value H[1] and the value H[2] without calculating the value H.

As a specific example, the H calculation unit 34 calculates an exclusive OR of the value C[i] for each integer i of i=1, L to generate the value H[1]. That is, the H calculation unit 34 calculates the value H[1] as indicated in Formula 7.

$$H[1]=C[1]\oplus C[2]\oplus L\oplus C[L-1]\oplus C[L] \quad \text{[Formula 7]}$$

The H calculation unit 34 calculates a product of the value C[i] and a value $x^{L-i+1}$ on a Galois field $GF(2^n)$ to generate a value C*[i], for each integer i of i=1, . . . , L, and calculates an exclusive OR of the value C*[i] for each integer i of i=1, . . . , L to generate the value H[2]. That is, the H calculation unit 34 calculates the value H[2] as indicated in Formula 8. Note that x is a generator of the Galois field GF(2n).

$$H[2]=x^L\oplus C[1]\oplus x^{L-1}\oplus C[2]\oplus L\oplus x^2\oplus C[L-1]\oplus x^1\oplus C[L] \quad \text{[Formula 8]}$$

Figure 6:
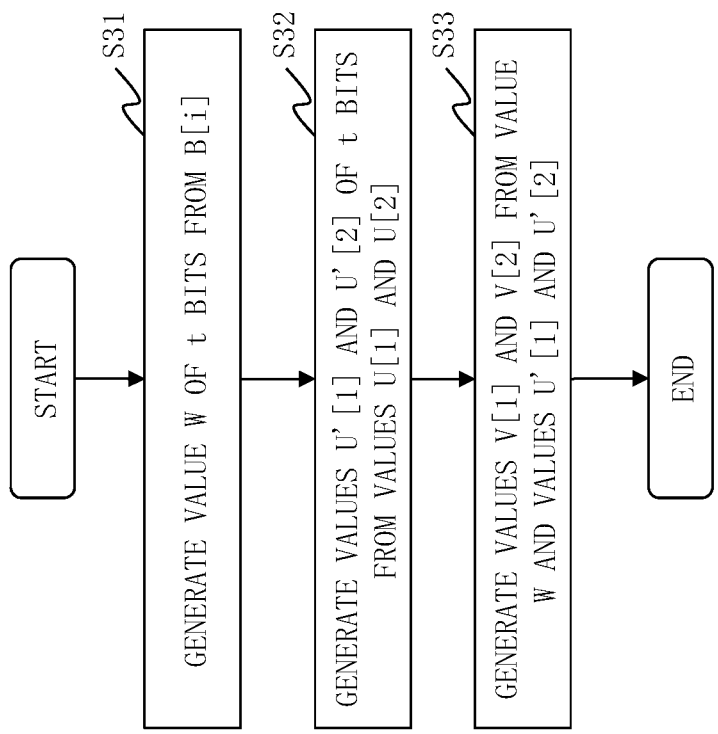
FIG. 6 is a flowchart of a function F according to the first embodiment.

Referring to FIG. 6, the function F according to the first embodiment will be described.

The function F is the function used in the tweak calculation process (step S3 of FIG. 2). In the following description, it is assumed that the method described with reference to FIGS. 4 and 5 has been applied as the compression process (step S2 of FIG. 2).

(Step S31: W Generation Process)

The W generation unit 41 retrieves the value B[i] for each integer i of i=1, . . . , L from the memory 12. The value B[i] is the value generated in step S23 of FIG. 4.

The W generation unit 41 calculates an exclusive OR of the value B[i] for each integer i of i=1, . . . , L to generate a value B. That is, the W generation unit 41 calculates the value B as indicated in FIG. 9.

$$B=B[1]\oplus B[2]\oplus L\oplus B[L-1]\oplus B[L] \quad \text{[Formula 9]}$$

The W generation unit 41 generates a value W of t bits by adding one or more bits to the value B. As a specific example, the W generation unit 41 generates the value W of t bits by adding one or more bits of 0 to the end of the value B. That is, W=B∥0 . . . 0. The W generation unit 41 writes the value W in the memory 12.

Note that the W generation unit 41 is not limited to adding one or more bits of 0, and may add one or more bits of 1 or may add a bit string that is a combination of 0 and 1. The W generation unit 41 may add one or more bits to the beginning of the value B or may add one or more bits at any other position in the value B, instead of adding one or more bits to the end of the value B.

(Step S32: U' Generation Process)

If the value U[i] is not t bits, the U' generation unit 42 generates a value U'[i] of t bits by adding one or more bits to the value U[i], for each integer i of i=1, 2. The value U[i] is the value extracted in step S3 of FIG. 2. As a specific example, the U' generation unit 42 generates the value U' [i] of t bits by adding one or more bits of 0 to the end of the value U[i].

Note that the U' generation unit 42 is not limited to adding one or more bits of 0, and may add one or more bits of 1 or may add a bit string that is a combination of 0 and 1. The U' generation unit 42 may add one or more bits to the beginning of the value U or may add one or more bits at any other position in the value U, instead of adding one or more bits to the end of the value U.

If the value U[i] is t bits, the U' generation unit 42 sets the value U[i] for each integer i of i=1, 2 as the U'[i].

The U' generation unit 42 writes the value U'[i] for each integer i of i=1, 2 in the memory 12.

(Step S33: V Generation Process)

The V generation unit 43 retrieves the value W and the value U' [i] for each integer i of i=1, 2 from the memory 12.

The V generation unit 43 calculates an exclusive OR of the value W and the value U'[i] to generate a value V[i], for each integer i of i=1, 2. That is, the V generation unit 43 calculates the value V[i] as indicated in Formula 10.

$$V[i]=W \oplus U'[i] \quad \text{[Formula 10]}$$

The index function according to the first embodiment will be described.

The index function is the function used in the first encryption process (step S4 of FIG. 2). In the following description, it is assumed that the method described with reference to FIGS. 4 and 5 has been applied as the compression function (step S2 of FIG. 2). It is also assumed that s=4, that is, Set(T)=[0,4]×{0,1}$^t$.

For the integer i and the bit length |M|, which are input, the index function outputs i if the bit length |M| is a multiple of n+d, and outputs 2i otherwise. That is, index(i, |M|)=i if the bit length |M| is a multiple of n+d, and index(i, |M|)=2i otherwise.

Alternatively, for the integer i and the bit length |M|, which are input, the index function outputs 2i if the bit length |M| is a multiple of n+d, and outputs i otherwise. That is, index(i, |M|)=2i if the bit length |M| is a multiple of n+d, and index(i, |M|)=i otherwise.

Effects of First Embodiment

As described above, the message authentication apparatus 10 according to the first embodiment realizes a message authentication algorithm using a tweakable block cipher.

With the message authentication algorithm realized by the message authentication apparatus 10 according to the first embodiment, it can be indicated that the advantage of pseudo-randomness is bound as indicated in Formula 11.

$$Adv_F(D) \leq O\left(\frac{q^2}{2^{n+min[n,2i]}} + \left(\frac{q}{2^n}\right)^2\right) \quad \text{[Formula 11]}$$

Therefore, when n/2≤t, pseudo-randomness can be guaranteed until the number of queries reaches q=O(2$^n$).

When n is fixed, the length of tweaks to be handled is shorter in a tweakable block cipher that satisfies the condition of t<n than in a tweakable block cipher that satisfies the condition of n≤t. Therefore, the internal construction can be simplified, so that at least one of the size of software and the size of hardware can be reduced.

Other Configurations*

<First Variation>

In the first embodiment, the functional components are realized by software. However, as a first variation, the functional components may be realized by hardware. With regard to the first variation, differences from the first embodiment will be described.

Figure 7:
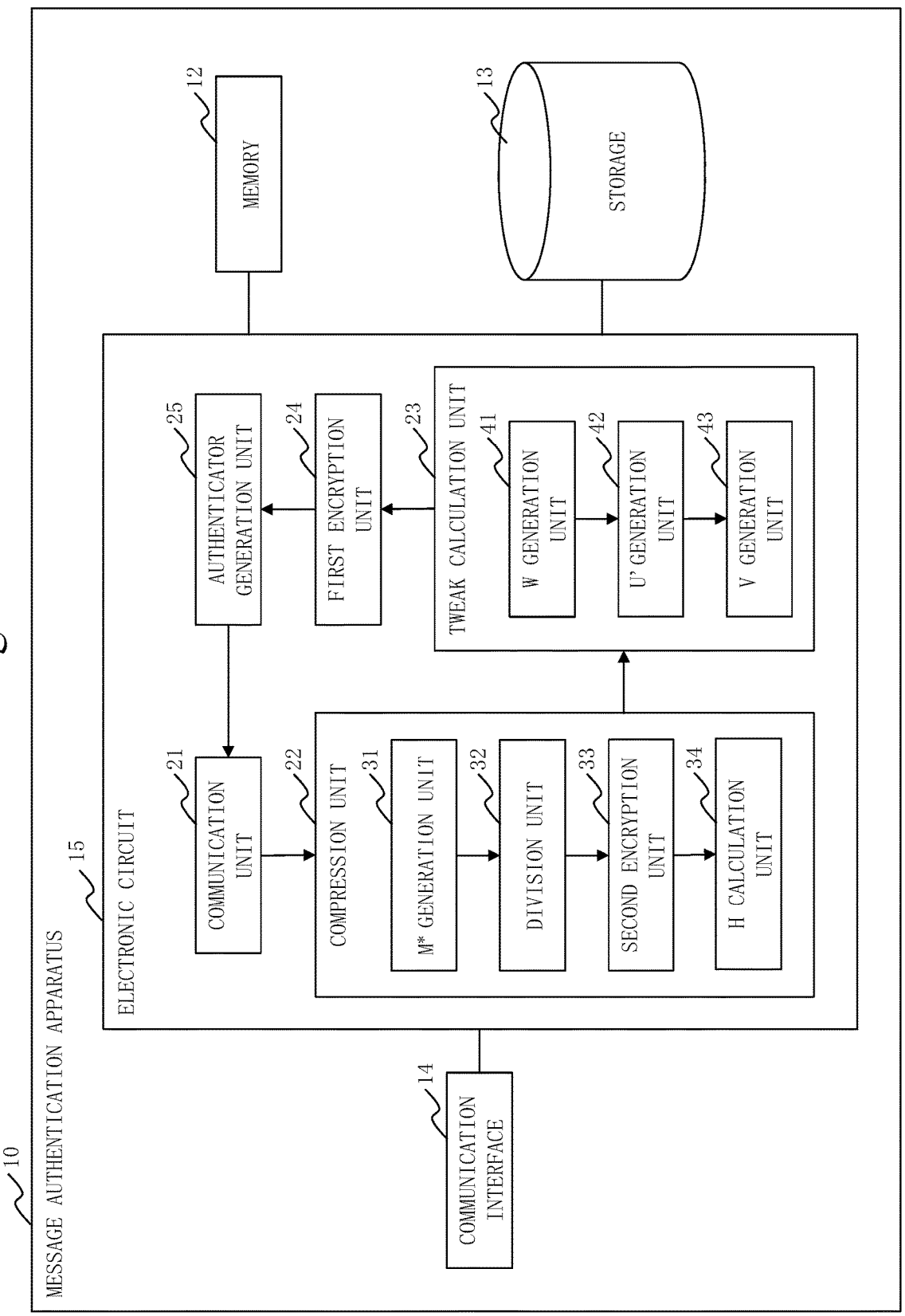
FIG. 7 is a configuration diagram of the message authentication apparatus 10 according to a first variation.

Referring to FIG. 7, a configuration of the message authentication apparatus 10 according to the first variation will be described.

When the functional components are realized by hardware, the message authentication apparatus 10 includes an electronic circuit 15 in place of the processor 11. The electronic circuit 15 is a dedicated circuit that realizes the functions of the functional components.

The electronic circuit 15 is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit 15, or the functional components may be distributed among and realized by a plurality of electronic circuits 15.

Figure 8:
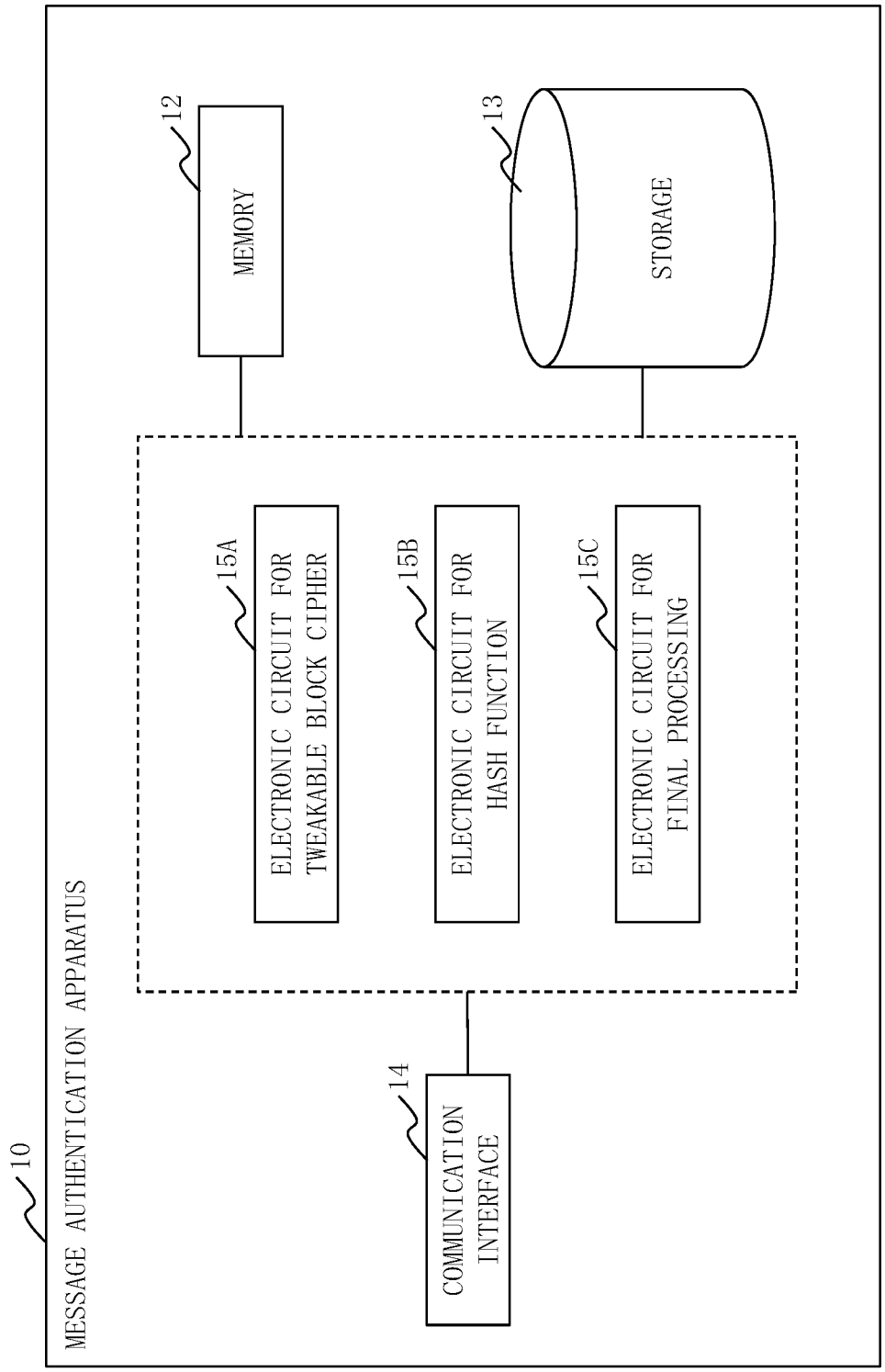
FIG. 8 is a diagram illustrating an example of a configuration of the message authentication apparatus 10 according to the first variation.

For example, as illustrated in FIG. 8, the message authentication apparatus 10 includes an electronic circuit 15A for the tweakable block cipher, an electronic circuit 15B for the hash function, and an electronic circuit 15C for final processing, as the electronic circuit 15.

The electronic circuit 15A for the tweakable block cipher performs calculations of the tweakable block cipher E. The electronic circuit 15B for the hash function performs the compression process (step S2 of FIG. 2). The electronic circuit 15C for final processing performs the tweak calculation process, the first encryption process, and the authenticator generation process (steps S3 to S5 of FIG. 2). However, the electronic circuit 15C for final processing causes the electronic circuit 15A for the tweakable block cipher to execute calculations of the tweakable block cipher E.

<Second Variation>

As a second variation, some of the functional components may be realized by hardware, and the rest of the functional components may be realized by software.

Each of the processor 11, the memory 12, and the electronic circuit 15 is also referred to as electronic circuitry. That is, the functions of the functional components are realized by the electronic circuitry.

REFERENCE SIGNS LIST

10: message authentication apparatus, 11: processor, 12: memory, 13: storage, 14: communication interface, 21:

communication unit, 22: compression unit, 23: tweak calculation unit, 24: first encryption unit, 25: authenticator generation unit, 31: M* generation unit, 32: division unit, 33: second encryption unit, 34: H calculation unit, 41: W generation unit, 42: U' generation unit, 43: V generation unit

The invention claimed is:

1. A message authentication apparatus to generate an authenticator Z for a message M, using a tweakable block cipher E that takes as input a tweak of t bits and outputs a value of n bits, where t and n are integers of 1 or more, the message authentication apparatus comprising:
processing circuitry to:
generate two values, a value H[1] and a value H[2], each having n bits from the message M;
extract two values, a value U[1] and a value U[2], from most significant min{t, n/2} bits and least significant min{t, n/2} bits of the value H[1], generate a value V[1] of t bits using as input the message M and the value U[1], and generate a value V[2] of t bits using as input the message M and the value U[2];
encrypt the value H[2] by the tweakable block cipher E, using the value V[1] as a tweak, to generate a value Z[1], and encrypt the value H[2] by the tweakable block cipher E, using the value V[2] as a tweak, to generate a value Z[2]; and
generate the authenticator Z from the value Z[1] and the value Z[2],
wherein the processing circuitry is further to perform one of the following processes with the authenticator Z,
a transmission process of transmitting the authenticator Z and the message M via a communication medium to an external apparatus, which generates a second authenticator Z' from the message M and comparing the second authenticator Z' to the authenticator Z to authenticate the message M, and
an authentication process of receiving the second authenticator Z' and the message M via the communication medium from the external apparatus, and comparing the authenticator second authenticator Z' to the authenticator Z to authenticate the message M.

2. The message authentication apparatus according to claim 1,
wherein when an integer c is from 0 to t and an integer d is t−c, the processing circuitry generates a value M* of a multiple of n+d bits by adding one or more bits to the message M when the message M is not a multiple of n+d bits, and sets the message M as the value M* when the message M is a multiple of n+d bits;
divides the value M* from beginning into L values, a value M[1], . . . , a value M[L], each having n+d bits;
divides a value M[i] into a value A[i] of n bits and a value B[i] of d bits, and encrypts the value A[i] by the tweakable block cipher E, using a value of t bits generated from the value B[i] and a value expressing the value i in c bits as a tweak, to generate a value C[i], for each integer i of i=1, . . . , L; and
calculates the value H[1] and the value H[2], using the value C[i] for each integer i of i=1, . . . , L.

3. The message authentication apparatus according to claim 2,
wherein the processing circuitry generates the value H[1] by calculating an exclusive OR of the value C[i] for each integer i of i=1, . . . , L, and generates the value H[2] by calculating a product of the value C[i] and a value $x^{L-i+1}$ on a Galois field GF($2^n$) to generate a value C*[i] for each integer i of i=1, . . . , L, and calculating an exclusive OR of the value C*[i] for each integer i of i=1, . . . , L.

4. The message authentication apparatus according to claim 2,
wherein the processing circuitry generates a value B by calculating an exclusive OR of the value B[i] for each integer i of i=1, . . . , L, and generates a value W of t bits by adding one or more bits to the value B;
generates a value U'[i] of t bits by adding one or more bits to the value U[i] when the value U[i] for each integer i of i=1, 2 is not t bits, and sets the value U[i] as the U'[i] when the U[i] is t bits; and
generates the value V[i] by calculating an exclusive OR of the value W and the value U'[i], for each integer i of i=1, 2.

5. The message authentication apparatus according to claim 1,
wherein a first argument and a second argument of t bits are input as the tweak to the tweakable block cipher E, and
wherein for each integer i of i=1, 2, the processing circuitry encrypts the value H[2] by the tweakable block cipher E, using an index determined based on the message and the integer i as the first argument and using the value V[i] as the second argument, to generate a value Z[i].

6. The message authentication apparatus according to claim 1,
wherein the processing circuitry generates the authenticator Z by calculating an exclusive OR of the value Z[1] and the value Z[2].

7. A message authentication method for generating an authenticator Z for a message M, using a tweakable block cipher E that takes as input a tweak of t bits and outputs a value of n bits, where t and n are integers of 1 or more, the message authentication method comprising:
generating two values, a value H[1] and a value H[2], each having n bits from the message M;
extracting two values, a value U[1] and a value U[2], from most significant min{t, n/2} bits and least significant min{t, n/2} bits of the value H[1], generating a value V[1] of t bits using as input the message M and the value U[1], and generating a value V[2] of t bits using as input the message M and the value U[2];
encrypting the value H[2] by the tweakable block cipher E, using the value V[1] as a tweak, to generate a value Z[1], and encrypting the value H[2] by the tweakable block cipher E, using the value V[2] as a tweak, to generate a value Z[2];
generating the authenticator Z from the value Z[1] and the value Z[2];
performing one of the following processes with the authenticator Z,
transmitting the authenticator Z and the message M via a communication medium to an external apparatus, which generates a second authenticator Z' from the message M and comparing the second authenticator Z' to the authenticator Z to authenticate the message M, and
receiving the second authenticator Z' and the message M via the communication medium from the external apparatus, and comparing the authenticator second authenticator Z' to the authenticator Z to authenticate the message M.

8. A non-transitory computer readable medium storing a message authentication program for generating an authenticator Z for a message M, using a tweakable block cipher E that takes as input a tweak of t bits and outputs a value of n bits, where t and n are integers of 1 or more, the message authentication program causing a computer to function as a message authentication apparatus to perform:

a compression process of generating two values, a value H[1] and a value H[2], each having n bits from the message M;

a tweak calculation process of extracting two values, a value U[1] and a value U[2], from most significant min{t, n/2} bits and least significant min{t, n/2} bits of the value H[1], generating a value V[1] of t bits using as input the message M and the value U[1], and generating a value V[2] of t bits using as input the message M and the value U[2];

a first encryption process of encrypting the value H[2] by the tweakable block cipher E, using the value V[1] as a tweak, to generate a value Z[1], and encrypting the value H[2] by the tweakable block cipher E, using the value V[2] as a tweak, to generate a value Z[2];

an authenticator generation process of generating the authenticator Z from the value Z[1] and the value Z[2]; and one of the following:

a transmission process of transmitting the authenticator Z and the message M via a communication medium to an external apparatus, which generates a second authenticator Z' from the message M and comparing the second authenticator Z' to the authenticator Z to authenticate the message M, and an authentication process of receiving the second authenticator Z' and the message M via the communication medium from the external apparatus, and comparing the authenticator second authenticator Z' to the authenticator Z to authenticate the message M.

* * * * *